(12) United States Patent
Liang

(10) Patent No.: US 12,471,762 B2
(45) Date of Patent: Nov. 18, 2025

(54) PANORAMIC VIEW ATTACHMENT FOR COLONOSCOPY SYSTEMS

(71) Applicant: Arizona Board of Regents on Behalf of the University of Arizona, Tucson, AZ (US)

(72) Inventor: Rongguang Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 618 days.

(21) Appl. No.: 17/904,421

(22) PCT Filed: Feb. 18, 2021

(86) PCT No.: PCT/US2021/018576
§ 371 (c)(1),
(2) Date: Aug. 17, 2022

(87) PCT Pub. No.: WO2021/168113
PCT Pub. Date: Aug. 26, 2021

(65) Prior Publication Data
US 2023/0068033 A1 Mar. 2, 2023

Related U.S. Application Data

(60) Provisional application No. 62/978,063, filed on Feb. 18, 2020.

(51) Int. Cl.
*A61B 1/00* (2006.01)
*A61B 1/05* (2006.01)
*A61B 1/06* (2006.01)

(52) U.S. Cl.
CPC .......... *A61B 1/00174* (2013.01); *A61B 1/053* (2013.01); *A61B 1/0623* (2013.01)

(58) Field of Classification Search
CPC ... A61B 1/00174; A61B 1/053; A61B 1/0623; A61B 1/00101; A61B 1/00105; A61B 1/00179; A61B 1/00181
See application file for complete search history.

(56) References Cited

U.S. PATENT DOCUMENTS

| 5,929,901 A | 7/1999 | Adair et al. |
| 5,937,212 A * | 8/1999 | Kurahashi ............ H04N 13/239 396/326 |

(Continued)

FOREIGN PATENT DOCUMENTS

WO 2014186525 A1 11/2014

OTHER PUBLICATIONS

International Search Report and Written Opinion mailed Apr. 29, 2021 for International Patent Application No. PCT/US2021/018576.

(Continued)

*Primary Examiner* — Aaron B Fairchild
(74) *Attorney, Agent, or Firm* — Perkins Coie LLP

(57) ABSTRACT

Single viewpoint panoramic imaging attachments for a colonoscope are disclosed that are compact in size and provide 360-degree side and rear-views in a single image. One panoramic attachment assembly includes a plurality of micro-imaging subsystems that are positioned around a central opening. Each micro-imaging subsystem includes a reflector to receive light that is reflected from a surrounding tissue, an imaging lens, and a detector to generate signals corresponding to one section of a panoramic image of the surrounding tissue. The micro-imaging subsystems are arranged to all have a common view point, and are configured to collectively form a full 360-degree image of the surrounding tissue.

22 Claims, 4 Drawing Sheets

(56) References Cited

U.S. PATENT DOCUMENTS

| | | | |
|---|---|---|---|
| 9,554,692 | B2 | 1/2017 | Levy |
| 9,907,457 | B2 | 3/2018 | Grant et al. |
| 2004/0249247 | A1 | 12/2004 | Iddan |
| 2008/0045797 | A1* | 2/2008 | Yasushi .............. A61B 1/00101 600/175 |
| 2013/0172670 | A1* | 7/2013 | Levy ..................... A61B 1/053 600/110 |
| 2016/0006943 | A1 | 1/2016 | Ratnakar |

OTHER PUBLICATIONS

Arber N, Grinshpon R, Pfeffer J, Maor L, Bar-Meir S, Rex D. Proof-of-concept study of the Aer-O-Scope (TM) omnidirectional colonoscopic viewing system in ex vivo and in vivo porcine models. Endoscopy. May 2007;39(5):412-417.

Barclay RL, Vicari JJ, Doughty AS, Johanson JF, Greenlaw RL. Colonoscopic withdrawal times and adenoma detection during screening colonoscopy. N Engl J Med. Dec. 14, 2006;355(24):2533-2541.

Bhatnagar BN, Sharma CL, Gupta SN, Mathur MM, Reddy DC. Study on the anatomical dimensions of the human sigmoid colon. Clin Anat. Apr. 2004;17(3):236-243.

Borg BB, Gupta NK, Zuckerman GR, Banerjee B, Gyawali CP. Impact of obesity on bowel preparation for colonoscopy. Clin Gastroenterol Hepatol. Jun. 2009;7(6):670-675.

DeMarco DC, Odstrcil E, Lara LF, et al. Impact of experience with a retrograde-viewing device on adenoma detection rates and withdrawal times during colonoscopy: the Third Eye Retroscope study group. Gastrointestinal endoscopy. Mar. 2010;71(3):542-550.

Dik VK, Gralnek IM, Segol O, Suissa A, Belderbos TD, Moons LM, Segev M, Domanov S, Rex DK, Siersema PD. Multicenter, randomized, tandem evaluation of EndoRings colonoscopy—results of the Clever study. Endoscopy 2015; 47: 1151-1158.

Fisher DA, Maple JT, Ben-Menachem T, et al. Complications of colonoscopy. Gastrointest Endosc. Oct. 2011;74(4):745-752.

Floer M, Biecker E, Fitzlaff R, Röming H, Ameis D, Heinecke A, Kunsch S, Ellenrieder V, Ströbel P, Schepke M, Meister T. Higher adenoma detection rates with endocuff-assisted colonoscopy—a randomized controlled multicenter trial. PLoS One 2014; 9.

Gralnek IM, Suissa A, Domanov S. Safety and efficacy of a novel balloon colonoscope—A prospective cohort study. Endoscopy 2014; 46: 883-7.

Gralnek, Ian M. "Emerging techn advancements in colonosc: Third Eye Retro & Third Eye Pano, Fuse Full Spectrum Endoscopy colonoscopy platform, Extra-Wide-Angle-View colonoscope, and Navi Aid TMG-Eye balloon colonoscope." Dig Endos 27, No. 2 (2015): 223-231.

Gralnek, Ian M., et al. "Standard forward-viewing colonoscopy versus full-spectrum endoscopy: an international, multicentre, randomised, tandem colonoscopy trial." The lancet oncology 15, No. 3 (2014): 353-360.

Halpern, Zamir, et al. "Comparison of adenoma detection and miss rates between a novel balloon colonoscope and standard colonoscopy: a randomized tandem study." Endoscopy 10, No. 03 (2015): 238-244.

Harrison M, Singh N, Rex DK. Impact of proximal colon retroflexion on adenoma miss rates. Am. J. Gastroenterol. 2004; 99: 519-22.

Hasan N, Gross SA, Gralnek IM, Pochapin M, Kiesslich R, Halpern Z. A novel balloon colonoscope detects significantly more simulated polyps than a standard colonoscope in a colon model. Gastrointest. Endosc. Published online Jun. 11, 2014.

Hewett DG, Rex DK. Miss rate of right-sided colon examination during colonoscopy defined by retroflexion: An observational study. Gastrointest. Endosc. 2011; 74: 246-52.

Hixson LJ, Fennerty MB, Sampliner RE, Garewal HS. Prospective blinded trial of the colonoscopic miss-rate of large colorectal polyps. Gastrointest. Endosc. 1991; 37: 125-7.

Kahi CJ, Li X, Eckert GJ, Rex DK. High colonoscopic prevalence of proximal colon serrated polyps in average-risk men and women. Gastrointest Endosc. Mar. 2012;75(3):515-520.

Lee A, Iskander JM, Gupta N, et al. Queue position in the endoscopic schedule impacts effectiveness of colonoscopy. Am J Gastroenterol. Aug. 2011;106(8):1457-1465.

Lee YT, Lai LH, Hui AJ, Wong VW, Ching JY, Wong GL, Wu JC, Chan HL, Leung WK, Lau JY, Sung JJ, Chan FK. Efficacy of capassisted colonoscopy in comparison with regular colonoscopy: a randomized controlled trial. Am J Gastroenterol 2009; 104: 41-46.

Leufkens AM, DeMarco DC, Rastogi A et al. Effect of retrograde-viewing device on adenoma detection rate during colonoscopy: The Terrace study. Gastrointest. Endosc. 2011; 73: 480-9.

Leufkens AM, van Oijen MGH, Siersema PD. Factors influencing the miss rate of polyps in a back-to-back colonoscopy study. Endoscopy 2012; 44: 470-5.

Mamula P, Tierney WM, Banerjee S, et al. Devices to improve colon polyp detection. Gastrointest Endosc. Jun. 2011;73(6):1092-1097.

Mariotto AB, Yabroff KR, Shao Y, Feuer EJ, Brown ML. Projections of the cost of cancer care in the United States: 2010-2020. J Natl Cancer Inst. Jan. 19, 2011;103(2):117-128.

Peery AF, Dellon ES, Lund J, et al. Burden of gastrointestinal disease in the United States: 2012 update. Gastroenterology. Nov. 2012;143(5):1179-1187 e1173.

Pickhardt PJ, Nugent PA, Choi JR, Schindler WR. Flat colorectal lesions in asymptomatic adults: Implications for screening with CT virtual colonoscopy. American Journal of Roentgenology. Nov. 2004;183(5):1343-1347.

Rajender Katkam, Bhaskar Banerjee, Chih-Yu Huang, Xiaoyin Zhu, Luis Ocampo, Jerri-Lynn Kincade, and Rongguang Liang "Compact dual-view endoscope without field obscuration," Journal of Biomedical Optics 20(7), 076007 (Jul. 15, 2015).

Rex Douglas, et al. Adenoma miss rates are significantly lower and additional adenoma find rates are significantly higher using FUSE colonoscopy in patients age 50 years and older: a prospective randomized tandem study . . . Am J Gastroenterol. 2013;108:601.

Rex DK, Ahnen DJ, Baron JA, et al. Serrated lesions of the colorectum: review and recommendations from an expert panel. Am J Gastroenterol. Sep. 2012;107(9):1315-1329.

Rex DK, Cutler CS, Lemmel GT, et al. Colonoscopic miss rates of adenomas determined by back-to-back colonoscopies. Gastroenterology. Jan. 1997;112(1):24-28.

Rex DK, et al. High-definition colonoscopy versus Endocuff versus EndoRings versus full-spectrum endoscopy for adenoma detection at colonoscopy: a multicenter randomized trial. Gastrointest Endosc 2018; 88: 335-344.

Rex DK, Petrini JL, Baron TH, et al. Quality indicators for colonoscopy. Gastrointest Endosc. Apr. 2006;63(4 Suppl):S16-28.

Rex DK. Maximizing detection of adenomas and cancers during colonoscopy. Am J Gastroenterol. Dec. 2006;101(12):2866-2877.

Rex DK. Quality in colonoscopy: cecal intubation first, then what? Am J Gastroenterol. Apr. 2006;101(4):732-734.

Rubin, Moshe, Leigh Lurie, Konika Bose, and Sang H. Kim. "Expanding the view of a standard colonoscope with the Third Eye® Panoramic™ cap." World journal of gastroenterology: WJG 21, No. 37 (2015): 10683.

Sadahiro S, Ohmura T, Yamada Y, Saito T, Taki Y. Analysis of length and surface area of each segment of the large intestine according to age, sex and physique. Surgical and radiologic anatomy : SRA. 1992;14(3):251-257.

Saltzman, John R., "Burden and Costs of Gastrointestinal Disease in the U.S.", NEJM Journal Watch, Oct. 2018. Available at address: https://www.jwatch.org/na47723/2018/10/23/burden-and-costs-gastrointestinal-disease-us.

Singh S, Singh PP, Murad MH, Singh H, Samadder NJ. Prevalence, Risk Factors, and Outcomes of Interval Colorectal Cancers: A Systematic Review and Meta-Analysis. Am J Gastroenterol. Sep. 2014;109(9):1375-1389.

Summers RM, Handwerker LR, Pickhardt PJ, et al. Performance of a previously validated CT colonography computer-aided detection system in a new patient population. AJR Am J Roentgenol. Jul. 2008;191(1):168-174.

(56) References Cited

OTHER PUBLICATIONS

Tada M, Inoue H, Yabata E, Okabe S, Endo M. Colonic mucosal resection using a transparent cap-fitted endoscope. Gastrointest Endosc 1996; 44: 63-65.

Triadafilopoulos G, Li J. A pilot study to assess the safety and efficacy of the Third Eye Retrograde auxiliary imaging system during colonoscopy. Endoscopy. Jun. 2008;40(6):478-482.

Triadafilopoulos G, Watts HD, Higgins J, Van Dam J. A novel retrograde-viewing auxiliary imaging device (Third Eye Retroscope) improves the detection of simulated polyps in anatomic models of the colon. Gastrointestinal endoscopy. Jan. 2007;65(1):139-144.

Uraoka T, Tanaka S, Matsumoto T et al. A novel extra-wideangle-view colonoscope: A simulated pilot study using anatomic colorectal models. Gastrointest. Endosc. 2013; 77: 480-3.

Van Rijn JC, Reitsma JB, Stoker J, Bossuyt PM, van Deventer SJ, Dekker E. Polyp miss rate determined by tandem colonoscopy: a systematic review. Am J Gastroenterol. Feb. 2006;101(2):343-350.

Vucelic B, Rex D, Pulanic R, et al. The aer-o-scope: proof of concept of a pneumatic, skill-independent, self-propelling, self-navigating colonoscope. Gastroenterology. Mar. 2006;130(3):672-677.

Wada Y, Fukuda M, Ohtsuka K, Watanabe M, Fukuma Y, Wada Y, Wada M. Efficacy of Endocuff-assisted colonoscopy in the detection of colorectal polyps. Endosc Int Open 2018; 6:E425-E431.

Waye JD, Heigh RI, Fleischer DE, et al. A retrograde-viewing device improves detection of adenomas in the colon: a prospective efficacy evaluation (with videos). Gastrointestinal endoscopy. Mar. 2010;71(3):551-556.

Zauber AG, Winawer SJ, O'Brien MJ et al. Colonoscopy polypectomy and long-term prevention of colorectal-cancer deaths. N. Engl. J. Med. 2012; 366: 687-96.

\* cited by examiner

PANORAMIC VIEW ATTACHMENT FOR COLONOSCOPY SYSTEMS

CROSS-REFERENCE TO RELATED APPLICATION(S)

This patent document is a 371 National Phase Application of International Patent Application No. PCT/US2021/018576, filed Feb. 18, 2021, which claims priority to the U.S. Provisional application with Ser. No. 62/978,063, titled "Panoramic View Attachment for Colonoscopy Systems," filed Feb. 18, 2020. The entire contents of the above noted applications are incorporated by reference as part of the disclosure of this document.

TECHNICAL FIELD

This patent document generally relates to imaging system and more particularly to compact imaging subsystems for producing full view images.

BACKGROUND

In the United States, colorectal cancer (CRC) is the third leading cause of cancer-related deaths in men and in women, and the second most common cause of cancer deaths when men and women are combined. The national cost of CRC care was estimated to be $14.1 billion in 2010 and was projected to increase to $17.4 billion in 2020. Data further indicates that over 19 million colonoscopies are performed annually in the United States.

The death rate associated with colorectal cancer has been droppingin both men and women for several decades. One of the reasons is that colorectal polyps are now detected more often by screening and removed before they develop into cancers or are found earlier when the disease is easier to treat. Colonoscopy is the preferred method to detect and remove pre-cancerous polyps. However, multiple studies have demonstrated that a significant percentage of adenomas, up to 31%, can be missed during standard, forward-viewing colonoscopy because some polyps are hidden from forwardviewingendoscopes or cannot be distinguished from the surroundingmucosa. Missed polyps can also lead to interval colorectal cancers. Therefore, there is a need for improved imaging systems.

SUMMARY

The disclosed embodiments relate to single viewpoint panoramic imaging attachments for a colonoscope that, among other features and benefits, are compact in size, are cost effective by not requiring the replacement of existing endoscopy systems and provide 360-degree side and rear-views in a single image.

One aspect of the disclosed embodiments relates to a panoramic attachment assembly for a colonoscope that includes a plurality of micro-imaging subsystems that are positioned around a central opening. Each micro-imaging subsystem includes a reflector that is positioned to receive light that is reflected from a surrounding tissue, an imaging lens positioned to receive light that is reflected from the reflector, and a detector positioned to receive light from the imaging lens and to generate electrical signals corresponding to one section of a panoramic image of the surrounding tissue. The plurality of micro-imaging subsystems are arranged to all have a common view point, and the plurality of the micro-imaging subsystems are configured to collectively form a full 360-degree image of the surrounding tissue.

DETAILED DESCRIPTION

Figure 1:
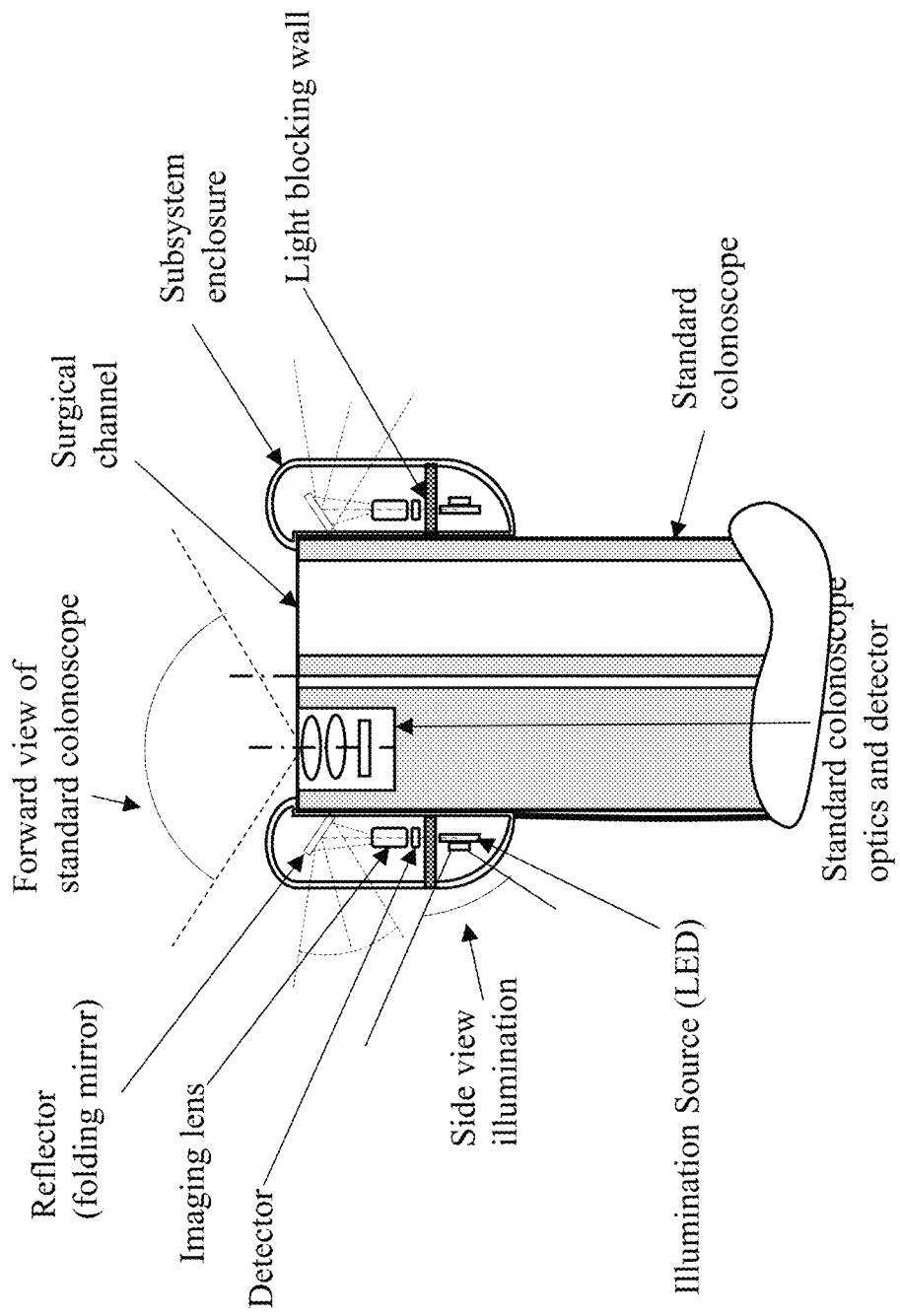
FIG. 1 illustrates a side view of a panoramic view colonoscope attachment in accordance with an example embodiment.

In a clean colon, there are two main reasons for not detecting lesions: 1) an incomplete view of areas behind folds and flexures, and 2) poor color contrast of some lesions that make them difficult to see.

The typical colon is approximately 1.6 meters long, with about 50 haustral folds and rectal valves that can hide polyps behind them. Optical colonoscopy has been shown to miss 12-17% of polyps larger than 1 cm in size. About two thirds of polyps that are missed by standard colonoscopy are located behind haustral folds. These anatomical sites tend to be hidden from the standard forward-viewing colonoscopes (with a typical 140°-170° C. field of view) and can often only be seen through endoscopist manipulation of the colonoscope, including efforts to flatten folds and straighten flexures, and prolonged retroflexion of the colonoscope itself. However, these maneuvers may not always be carried out, may not be carried out consistently for all sections of the colon, or may be done using a less than optimal technique as they require additional time, technical skill, and confer a limited patient risk. Therefore, even when such procedures are included, they may fail to provide a complete rear-view image to facilitate detection and removal of polyps.

Therefore, there is a critical need to reduce the adenoma miss rate of standard forward-viewing colonoscopy. Some existing systems have attempted to improve visualization capabilities of colonoscopes using attachments, such as transparent caps, cuffs or the like, that can be fitted to the distal tip of standard colonoscopy instruments. But these and other approaches have been technologically incomplete or have not been user friendly in clinical practice. In particular, these systems suffer from numerous shortcomings that include their inability to produce a 360-degree panoramic side view of the field of observation, difficulty of proper alignment and stitching of different field images, large footprint of the device, interference of illumination sources with proper imaging, low quality images, and difficulty of use by clinicians. Cost considerations are also important in design of such systems. For example, endoscopy systems include many components such as light sources, processors and electronics, endoscopes, displays, etc., which are expensive ($250K-$500K per endoscopy room) and the cost of replacing an existing system with a new one is a major obstacle to the implementation of new technologies. For successful adoption, a device has to be both economical and compatible with existing equipment.

The disclosed embodiments, among other features and benefits, address the above needs and enable full view imaging capability while allowing inspection behind the folds, permitting (or not interfering with) interventions such as polyp removal using standard colonoscopy, and improving visibility of poorly seen polyps. Since colonoscopy is used not only to detect polyps, but also to remove them, it is important that provide all of the above features and benefits without hindering those critical surgical procedures.

One aspect of the disclosed embodiments relates to a snap-on panoramic imaging device that includes an array of plurality of micro-imaging subsystems with a single viewpoint. The minimum number of micro-imaging subsystems is three and this number can be increased as needed to meet various cost, image quality, weight, or other requirements. In one embodiment, six micro-imaging subsystems are used. The disclosed devices, by providing a single viewpoint for the plurality of imaging subsystems, address a major hurdle in reconstruction of panoramic views that requires combing images from more than one camera.

The single viewpoint panoramic imaging attachments disclosed herein further provide the following features: 1) they are compact in size, which makes them suitable for attachment to existing colonoscopes; 2) they are cost effective by not requiring the replacement of existing endoscopy systems; 3) they provide 360-degree side and rear-views in a single image that can be used in conjunction with a forward image produced from a standard colonoscope; 4) the forward and side/backward views are registered after the calibration, if the attachment is snapped to the colonoscope at the same position, and can be displayed as a single image for easy viewing; 5) they produce a single panoramic image to allow viewing of the full field, thus preventing physician fatigue and maximizing polyp detection; 6) they avoid the need to retroflex the endoscope (i.e., twist and turn the endoscope end to enable backward or side views), a process which can result in discomfort and trauma to the patient; and 7) they permit endoscopists to continue to perform standard interventions such as polyp removal or biopsy.

The disclosed devices provide a complete view of the colon in a single image (after the side-view panoramic image from this device and the forward-view image from the colonoscope are integrated together into one image) that can substantially improve polyp detection. Its low cost and compatibility with existing endoscopes facilitate rapid adoption by clinicians. Substantially fewer missed polyps not only diminishes 'interval cancers' but may allow the time between procedures to be safely increased, with a fall in healthcare cost. Fewer procedures in a lifetime should reduce overall complications (currently about 2.8/1000).

FIG. 1 illustrates a side view of a panoramic view colonoscope attachment in accordance with an example embodiment. FIG. 1 illustrates a main shaft or channel of a standard colonoscope, as well as its forward viewing optical section. Side views of two of the plurality of micro-imaging subsystems are also depicted as being positioned within an enclosure; each of the subsystems includes illumination and imaging components that allow side and/or rear-view images to be captured. In particular, within each subsystem, an illumination source, such as an LED, is included to provide side/rear illumination. The illumination source can, for example, be a white light source. The illumination source provides uniform side-view illumination. Each imaging system can optionally include a blocking wall that can improve the quality of captured images by blocking stray and/or direct light from the illumination source from reaching the imaging subsystem. Alternatively, the illumination source can be placed in a separate chamber. In some embodiments, since the standard colonoscope already includes a strong forward-facing illumination source and the colon cavity can be treated as a weak integrating sphere, the reflected light from the tissue that is illuminated by the standard colonoscope light source can be strong enough for side-view illumination purposes. In such embodiments, the side-view illumination source may be eliminated in one or more of the subsystems.

Referring back to FIG. 1, each subsystem further includes a reflector (e.g., a folding mirror, or a freeform reflector) that is positioned at an oblique angle with respect to the sidewall of the endoscope, the outside wall of the subsystem enclosure (or both). The angle can be changed to adjust the angle of received light by the imaging subsystem. The reflector receives reflected light from the object of interest (i.e., section of colon or rectum being viewed) and provides the light to an imaging lens, which is then incident on a detector. The folding mirror can be a flat mirror for simplicity, or a freeform mirror to improve the system performance. The field of view for each subsystem may be equal to, or slightly larger than, 360°/M, where M is the number of the micro-imaging subsystems. For example, the fields of view can have 5 to 20 degrees of overlap. The imaging lens can have spherical or aspherical surfaces and can be a microlens.

The detector can be a pixelated detector, such as a CMOS or CCD sensor. Due to space limitations, a small CMOS sensor is preferred. OmniVision's OV6946 (with dimensions 0.95×0.94 mm) is one example sensor that includes 400×400 pixels, where each pixel is 1.75×1.75 μm. The detector produces electrical signals in correspondence with the light that is incident thereon. The electrical signals (e.g., one per detector pixel) are then processed to produce the corresponding images. The detector is thus communicatively coupled to a processor (e.g., microprocessor) and/or other electronic circuitry that can carry out the various signal and image processing operations. Such processing can include generation of panoramic images after performing image stitching and any other image processing operations that may be needed. The processor may be a single processor or multiple processors, and can be located in the attachment housing, or remotely from the housing, or both.

Figure 2:
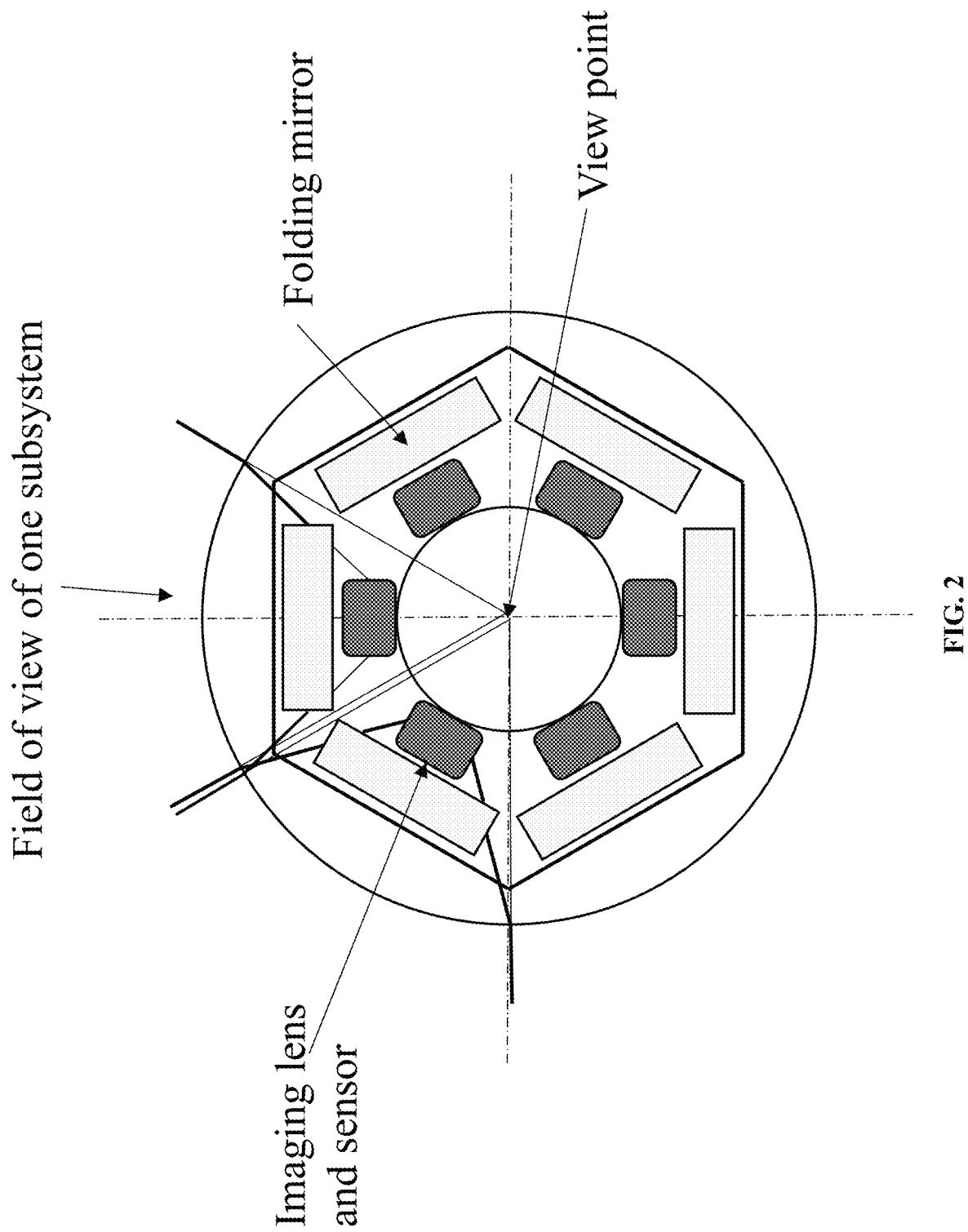
FIG. 2 illustrates a top view of a panoramic view colonoscope attachment with six subsystems in accordance with an example embodiment.

FIG. 2 illustrates a top view of the panoramic view colonoscope attachment with six subsystems in accordance with an example embodiment. Each subsystem can be constructed similar to the subsystem of FIG. 1, thus creating six identical subsystems that are positioned around the circumferences of the colonoscope shaft. The six subsystems in FIG. 2 have a common view point. In this implementation, this means that when the imaging system is unfolded (i.e., the imaging lens and detector are placed in a horizonal position behind the folding mirror), the entrance pupil of each imaging subsystem is identically located at the center of the multi-subsystem assembly, as shown in FIG. 2.

Figure 3:
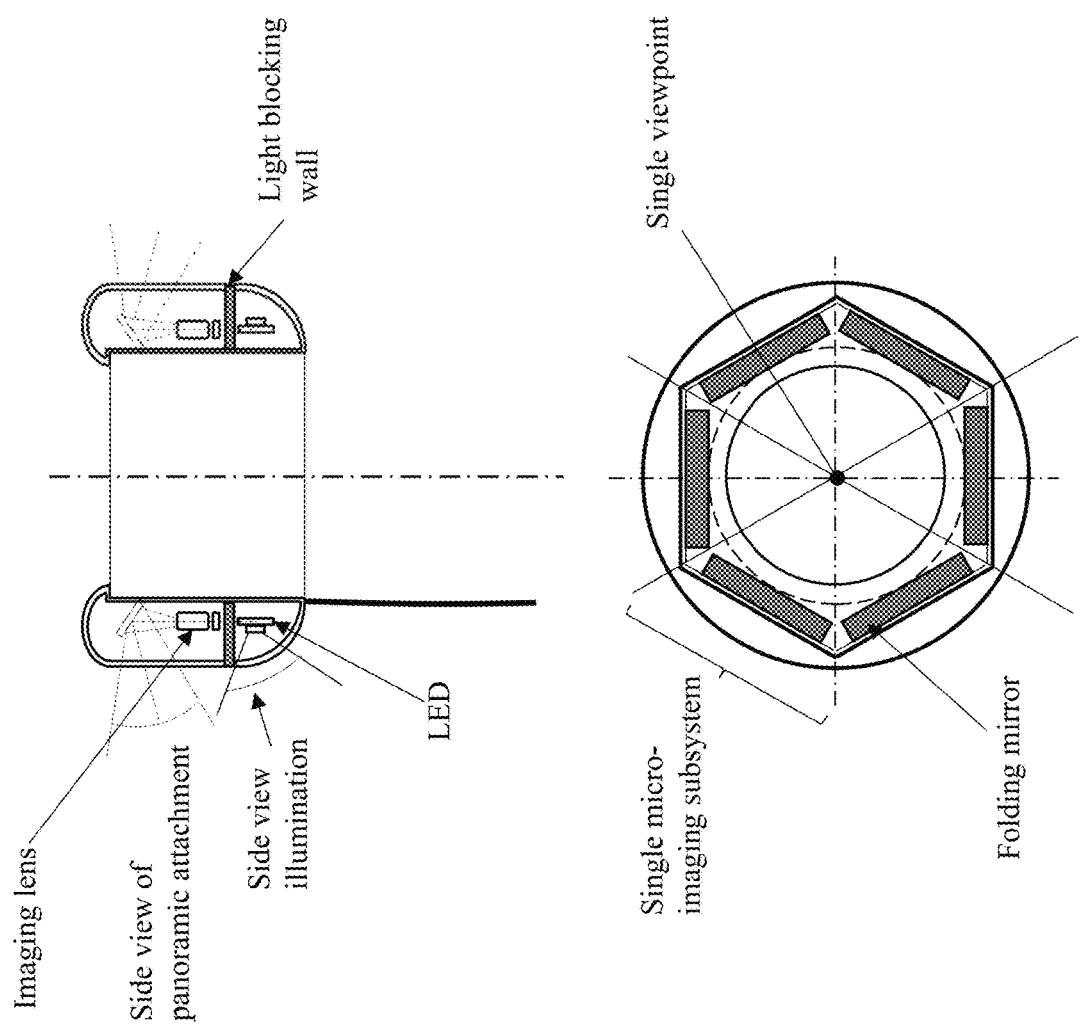
FIG. 3 illustrated the side view and top view illustrations of the panoramic view attachment of an example embodiment in a single drawing.

FIG. 3 provides the side view and top view illustrations of the panoramic view attachment in a single drawing to further facilitate the understanding subsystems arrangement. Having a common view point is advantageous because it facilitates the generation of a proper panoramic image. In particular, when inserted and moved within the colon, the colonoscope may not be symmetrically positioned within the colon, and thus some subsystems may be located further away and some subsystems may be closer to the sidewalls of the colon. Having a common view point for all imaging subsystems makes it easier to properly stitch different images to form a panoramic view. This aspect of the disclosed embodiments is further described below.

One potential issue in stitching images from multiple cameras is the parallax errors since each camera specifies a distinct viewpoint that is different from each of the others. As a result, a noticeable gap may arise near the boundary of two component images of the fused panoramic image. A solution to this problem is to arrange the camera arrays in a fashion that viewpoints of all component cameras are brought together, merging into a single viewpoint and leading to reduced parallax errors.

With all pictures taken by the component cameras sharing a common viewpoint, stitching individual images into a panorama is much simpler, more robust and computationally efficient than other multi-camera systems where component cameras have different viewpoints. For example, to form the panoramic image, 2D homography mapping between the camera views can be used to perform the stitching. If the camera motion between two images is pure rotation with no translation, the two images are related by a projective linear mapping $m2 \propto H*m1$, where $m1=(x1,y1,1)$ and $m2=(x2,y2,1)$ are the projective image coordinates in the two images of the same 3D point, and H is the 3×3 homography matrix that depends on the camera rotation and its intrinsic parameters. In the disclosed colonoscope attachments, all cameras have the same effective viewpoint, and thus the images of any two cameras can be considered as having been created by the same camera under a rotation. The knowledge of the inter-camera homographies enables us to project all multiple images to a common view (single viewpoint) to form a panoramic picture of the scene. The inter-camera homographies depend only on the relative position and orientation between the cameras and can be calculated during the calibration phase. Once the homographies are established, the stitching can take place in a straight forward manner.

The disclosed micro-imaging subsystems can be assembled to form an attachment for a standard colonoscope. The attachment can include a clear annular enclosure with, for example, curved top and/or bottom edges to facilitate insertion and movement of the colonoscope with attachments mounted thereon in the colon. The attachment assembly can include a center thru opening to allow the attachment to slide onto the colonoscope. The attachment assembly may be secured to the colonoscope via notches, grooves, clamps or other fastening means. For example, the attachment can be slid onto the shaft of the colonoscope until it snaps into place. In some implementations after the attachment assembly is secured to the colonoscope, the radial extend of the colonoscope is increased by about 2 to 3 mm (on each side) due to the thickness of the mounted assembly. In some embodiments, the thickness of the attachment assembly can be further reduced to accommodate the desired application needs.

In some embodiments, the image quality can be further improved by placing a polarizer in front the illumination source to illuminate the surrounding tissue with polarized light. In such embodiments, a corresponding analyzer can be placed in the path of the received reflected light (for example, in front of the folding mirror) to allow light with desired polarization to pass therethrough. In this way, image quality can be improved, and a higher signal-to-noise ratio can be obtained.

At least two different configurations for panoramic imaging can be implemented: a configuration with a single sensor and a configuration with multiple sensors. While the single sensor configuration may be suitable for some applications, it also includes certain limitations; for example, the spatial resolution can be low, and it may not be compatible with the standard colonoscope. The panoramic imaging system with multiple sensors includes multiple identical optical systems and each system covers part of the panoramic view. While it is necessary to stitch images from multiple sensors to form a panoramic image, the major advantages include: the freedom in system construction to adapt to all commercial colonoscopes, and higher resolution.

One aspect of the disclosed embodiments related to a panoramic attachment assembly for a colonoscope that includes a plurality of micro-imaging subsystems positioned around a central opening. Each micro-imaging subsystem includes a reflector positioned to receive light that is reflected from a surrounding tissue, an imaging lens positioned to receive light that is reflected from the reflector, and a detector positioned to receive light from the imaging lens and to generate electrical signals corresponding to one section of a panoramic image of the surrounding tissue. The plurality of micro-imaging subsystems of the panoramic attachment assembly are arranged to all have a common view point, and the plurality of the micro-imaging subsystems are configured to collectively form a full 360-degree image of the surrounding tissue, In one example embodiment, each micro-imaging subsystem includes an illumination source configured to illuminate at least a section of the surrounding tissue. In another example embodiment, each micro-imaging subsystem includes a blocking wall positioned to prevent stray light from the illumination source to reach the detector. In yet another example embodiment, the illumination source is positioned within a chamber that is separate from a location of the reflector, the imaging lens or the detector. In still another example embodiment, the reflector is positioned at an oblique angle with respect to an axis that runs through the central opening.

In another example embodiment, the reflector forms a folded path for the light through the corresponding micro-imaging subsystem. In some example embodiments, the reflector is one of a flat mirror or a curved mirror. In still another example embodiment, the reflector is a freeform mirror.

According to another example embodiment, the plurality of micro-imaging subsystems consists of 6 micro-imaging subsystems. In another example, embodiment, the plurality of micro-imaging subsystems includes at least 3 micro-imaging subsystems. In some example embodiments, each of the plurality of micro-imaging subsystems has a field of view that is equal to, or slightly larger than, 360°/M, where M is the number of the plurality of the micro-imaging subsystems, and M is greater than or equal to three.

In some example embodiments, the panoramic attachment assembly has an annular shape. According to yet another example embodiment, a difference between an inner radius of the attachment assembly and the outer radius of the attachment assembly is between 2 to 3 mm. In another example embodiment, the detector comprises a pixeled CMOS sensor. In one example, embodiment, the panoramic attachment assembly includes an analyzer positioned in a path of the reflected light that reaches the detector, where the analyzer allows light having particular polarization to pass therethrough. In an example embodiment, the analyzer is positioned at the reflector. In still another example embodiment, the panoramic attachment assembly includes a light source and a polarizer configured to produce illumination light having the particular polarization.

According to another example embodiment, the panoramic attachment assembly includes an enclosure surrounding the plurality of subsystems, wherein at least a section of the enclosure faces away from the central opening is optically transparent. In yet another example embodiment, the central opening is configured to allow the attachment assembly to snap onto a colonoscope shaft. In still another example embodiment, each of the micro-imaging subsystems is configured to have an entrance pupil that coincides with an entrance pupil of all other micro-imaging subsystems. In another example embodiment, the entrance pupil is positioned at a center location of the central opening. In yet another example embodiment, each of the micro-imaging subsystems is positioned to receive light from a section of the surrounding tissue that is located to a side or a rear of a distal end of a colonoscope.

Another aspect of the disclosed embodiments related to a panoramic 360-degree view attachment assembly that includes three or more imaging subsystem positioned around a circular path, and a hollow opening to allow the attachment assembly to be secured onto a central shaft. The imaging subsystems are arranged to all have a common view point, and the imaging subsystems are configured to each have a field of view that is 360°/M, where M is the number of the imaging subsystems.

Figure 4:
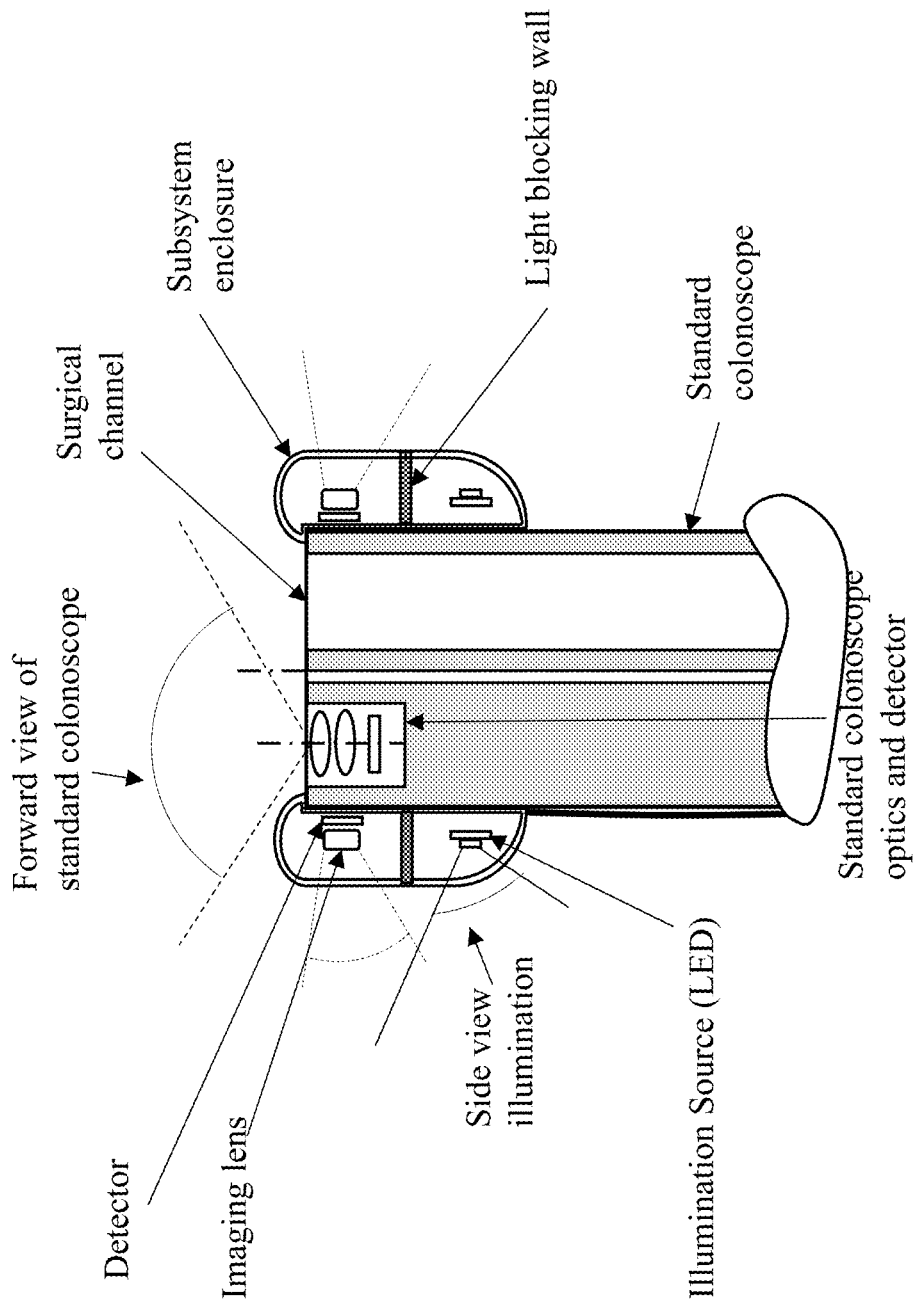
FIG. 4 illustrates a side view of a panoramic view colonoscope attachment in accordance with another example embodiment.

FIG. 4 is a side view of a panoramic view colonoscope attachment in accordance with another example embodiment, which includes similar components as those described in connection with previous figures, except that each micro-imaging subsystem doesn't have the folding mirror. The micro-imaging subsystem still has a common view point.

The embodiments disclosed herein, by the way of example and not by limitation, are described in the context of an attachment devices for colonoscopes. However, it should be understood that these embodiments are suitable for other applications, such as any medical application that utilizes endoscopes. More generally, the disclosed multi-subsystem imaging attachments can be used for attachment to circular poles, cables or other rigid or semi-rigid cylindrical components that can benefit from panoramic images, in applications ranging from inspection of pipes and crevasses to oil and gas exploration.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor may be configured to receive electrical signals or information from the disclosed sensors (e.g., CMOS sensors), and to process the received information to produce images or other information of interest. The communications between the disclosed detectors and the processors may be carried out via near field communication (NFC) protocols.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes Only a few implementations and examples are described and other implementations, enhancements and variations can be made based on what is described and illustrated in this patent document.

I claim:

1. A panoramic attachment assembly for a colonoscope, comprising:
a plurality of micro-imaging subsystems positioned around a central opening, each micro-imaging subsystem including:
an imaging lens positioned to receive light that is reflected from a surrounding tissue, and
a detector positioned to receive light from the imaging lens, and to generate electrical signals corresponding to one section of a panoramic image of the surrounding tissue, wherein,
the plurality of micro-imaging subsystems are arranged such that each micro-imaging subsystem is configured to have an entrance pupil that coincides with an entrance pupil of all other micro-imaging subsystems, and
the plurality of micro-imaging subsystems are configured to collectively form a full 360-degree image of the surrounding tissue.

2. The panoramic attachment assembly of claim 1, wherein each micro-imaging subsystem includes an illumination source configured to illuminate at least a section of the surrounding tissue.

3. The panoramic attachment assembly of claim 2, wherein each micro-imaging subsystem includes a blocking wall positioned to prevent stray light from the illumination source from reaching the detector.

4. The panoramic attachment assembly of claim 2, wherein the illumination source is positioned within a chamber that is separate from a location of a reflector positioned to receive light that is reflected from the surrounding tissue, the imaging lens or the detector.

5. The panoramic attachment assembly of claim 1, wherein each micro-imaging system includes a reflector positioned to receive light that is reflected from the surrounding tissue and provide the reflected light to the detector, wherein the reflector is positioned at an oblique angle with respect to an axis that runs through the central opening.

6. The panoramic attachment assembly of claim 1, wherein each micro-imaging system includes a reflector positioned to receive light that is reflected from the surrounding tissue and provide the reflected light to the detector, wherein the reflector forms a folded path for the light through the corresponding micro-imaging subsystem.

7. The panoramic attachment assembly of claim 1, wherein each micro-imaging system includes a reflector positioned to receive light that is reflected from the surrounding tissue and provide the reflected light to the detector, wherein the reflector is one of a flat mirror or a curved mirror.

8. The panoramic attachment assembly of claim 1, wherein each micro-imaging system includes a reflector positioned to receive light that is reflected from the surrounding tissue and provide the reflected light to the detector, wherein the reflector is a freeform mirror.

9. The panoramic attachment assembly of claim 1, wherein the plurality of micro-imaging subsystems consists of six micro-imaging subsystems.

10. The panoramic attachment assembly of claim 1, wherein the plurality of micro-imaging subsystems includes at least three micro-imaging subsystems.

11. The panoramic attachment assembly of claim 1, wherein each of the plurality of micro-imaging subsystems has a field of view that is equal to, or larger than, 360°/M, where M is a number of the plurality of the micro-imaging subsystems, and M is greater than or equal to three.

12. The panoramic attachment assembly of claim 1, wherein the panoramic attachment assembly has an annular shape.

13. The panoramic attachment assembly of claim 1, wherein a difference between an inner radius of the panoramic attachment assembly and an outer radius of the panoramic attachment assembly is between 2 to 3 mm.

14. The panoramic attachment assembly of claim 1, wherein the detector comprises a pixeled CMOS sensor.

15. The panoramic attachment assembly of claim 1, comprising an analyzer positioned in a path of the reflected light that reaches the detector, the analyzer allowing light having a particular polarization to pass therethrough.

16. The panoramic attachment assembly of claim 15, wherein each micro-imaging system includes a reflector positioned to receive light that is reflected from the surrounding tissue, wherein the analyzer is positioned at the reflector.

17. The panoramic attachment assembly of claim 15, comprising a light source and a polarizer configured to produce illumination light having the particular polarization.

18. The panoramic attachment assembly of claim 1, comprising an enclosure surrounding the plurality of micro-imaging subsystems, wherein at least a section of the enclosure that faces away from the central opening is optically transparent.

19. The panoramic attachment assembly of claim 1, wherein the central opening is configured to allow the panoramic attachment assembly to snap onto a colonoscope shaft.

20. The panoramic attachment assembly claim 1, wherein the entrance pupil is positioned at a center location of the central opening.

21. The panoramic attachment assembly of claim 1, wherein each of the plurality of the micro-imaging subsystems is positioned to receive light from a section of the surrounding tissue that is located to a side or a rear of a distal end of a colonoscope.

22. A panoramic 360-degree view attachment assembly, comprising:
    three or more imaging subsystems positioned around a circular path; and
    a hollow opening to allow the attachment assembly to be secured onto a central shaft, wherein:
        the three or more imaging subsystems are arranged to such that each micro-imaging subsystem is configured to have an entrance pupil that coincides with an entrance pupil of all other micro-imaging subsystems, and
        the imaging subsystems are configured to each have a field of view that is 360°/M, where M is the number of the imaging subsystems.

\* \* \* \* \*